(12) United States Patent
Castellon

(10) Patent No.: US 8,225,551 B2
(45) Date of Patent: Jul. 24, 2012

(54) DEVICE FOR OPERATING REAR SIDE WINDOWS OF CONVERTIBLE VEHICLES

(76) Inventor: Melchor Daumal Castellon, Barcelona (ES)

( * ) Notice: Subject to any disclaimer, the term of this patent is extended or adjusted under 35 U.S.C. 154(b) by 566 days.

(21) Appl. No.: 10/579,139

(22) PCT Filed: Feb. 9, 2005

(86) PCT No.: PCT/ES2005/000061
§ 371 (c)(1),
(2), (4) Date: May 15, 2006

(87) PCT Pub. No.: WO2006/000596
PCT Pub. Date: Jan. 5, 2006

(65) Prior Publication Data
US 2007/0084129 A1 Apr. 19, 2007

(30) Foreign Application Priority Data
Jun. 23, 2004 (ES) .................. 200401531

(51) Int. Cl.
*E05F 11/48* (2006.01)
(52) U.S. Cl. ............................. 49/352; 49/226
(58) Field of Classification Search ............ 49/226, 49/227, 348, 349, 352, 234
See application file for complete search history.

(56) References Cited

U.S. PATENT DOCUMENTS

| | | |
|---|---|---|
| 1,251,990 A | 1/1918 | Maise |
| 1,510,065 A | 9/1924 | Kurscheidt |
| 2,124,037 A | 7/1938 | Lavigne |
| 3,273,285 A | 9/1966 | Champion |
| 3,591,983 A * | 7/1971 | Hanson ..................... 49/227 |
| 4,051,632 A | 10/1977 | Fukumoto et al. |
| 4,094,100 A | 6/1978 | Fukumoto et al. |
| 4,589,227 A * | 5/1986 | Bickerstaff ................. 49/227 |
| 4,597,223 A * | 7/1986 | Shiraishi et al. ............. 49/352 |
| 4,633,613 A * | 1/1987 | Kobayashi et al. .......... 49/227 |
| 4,785,582 A * | 11/1988 | Tokue et al. ................ 49/211 |
| 4,922,783 A | 5/1990 | Wallace |
| 5,070,648 A | 12/1991 | Moriyama |
| 5,946,860 A | 9/1999 | Weber et al. |
| 5,960,588 A | 10/1999 | Wurm et al. |
| 6,425,204 B1 | 7/2002 | Renner |
| 6,526,696 B2 * | 3/2003 | Cardine ...................... 49/227 |
| 6,588,152 B2 | 7/2003 | Cabbane |
| 6,952,898 B2 | 10/2005 | Castellon |

FOREIGN PATENT DOCUMENTS

| | | |
|---|---|---|
| DE | 4140574 | 6/1993 |
| DE | 101 40 231 A1 | 4/2003 |
| EP | 0 904 966 A2 | 3/1999 |
| ES | 2 194 040 | 3/1996 |
| ES | 1051956 | 10/2002 |
| FR | 1197209 | 11/1959 |
| JP | 07300019 | 11/1995 |
| WO | WO 03/097976 | 11/2003 |

* cited by examiner

*Primary Examiner* — Jerry Redman
(74) *Attorney, Agent, or Firm* — Blank Rome LLP

(57) ABSTRACT

A device that includes at least one slider joined to a window which slides along the rail defining the trajectory for the window. The trajectory is defined by a departure angle formed by the vertical and initial upper curvature of the rail which is ±45° and the curvature radius of the aforementioned trajectory which is about 0 to 500 mm. The device includes a means of adjusting the position of the device with regard to a door including an upper pivoting axle on the rail which allows the device to tilt to fit it in the door with two lower transversal screws for lateral adjustment, and one screw on the slider for adjusting the window with regard to the rail and the slider.

4 Claims, 2 Drawing Sheets

DEVICE FOR OPERATING REAR SIDE WINDOWS OF CONVERTIBLE VEHICLES

RELATED APPLICATIONS

This application relates to commonly owned, currently pending U.S. patent application Ser. No. 10/533,895, filed May 5, 2005, entitled Adjustable Rail For Power Window Devices for Motor Vehicles, and U.S. patent application Ser. No. 11/152,112, now abandoned, filed Jun. 15, 2005 entitled Sliding Member For Power Window Devices in Motor Vehicles the subject matter of each of which is herein incorporated by reference.

FIELD OF THE INVENTION

This is an operating device comprising of at least one sliding part operated by an electrical motor using cables as is normal in the technique. The slider on the operating device is attached by any suitable means to the lower part of the cabriolet vehicle window for example using a holding clamp. This sliding device may slide along a rail which defines the trajectory of the window it is operating.

BACKGROUND OF THE INVENTION

Due to the shape of the vehicle, the trajectory of the rear side windows on cabriolet vehicles is usually curved with at least one inflection. This means that mechanisms to operate these windows are complex and costly.

SUMMARY OF THE INVENTION

In accordance with the invention there are two fundamental design parameters which may very simply solve the problems encountered in devices described above. These parameters directly concern the trajectory which the vehicle window follows and are: the angle of departure formed by the vertical and initial upper part of the rail: and the radius of curvature for this rail, which logically corresponds to the curvature of the device's rail.

In particular, operating tests have shown that the angle of departure must be between +45° and −45° and that the aforementioned radius of curvature must be in the interval between ∞ (straight trajectory) and 500 mm.

With this operating device for the side rear windows on cabriolet vehicles in the invention, it is possible to have one single rail; thereby structurally simplifying the overall mechanism.

There are important advantages from the above features. Firstly, the cost is drastically reduced, because operating devices of this type of window has a rail with three guides to operate the glass due to the trajectory (curved and with infections) which has been described in its operation. Moreover, the invention has one single rail with the aforementioned parameters in a simpler configuration to reduce development and design time. As a consequence of the simplification of the device, noise and operating vibrations are reduced.

The device in the invention also includes ways of adjusting the position with regard to the vehicle's door formed by an upper swivel axis on the rail which allows the device to tilt slightly in order for it to adjust to the vehicles door. It also has at least two lower transversal screws to laterally adjust the device's position and at least one screw in the slider to allow the class to be positioned with regard to the overall slider-rail mechanism.

BRIEF DESCRIPTION OF THE DRAWINGS

The features and advantages of the device in this invention shall be become clearer from the detailed description of a preferred implementation. This description is given hereinafter as a non-limiting example with reference to the drawings. In these drawings.

FIGS. of 3 to 5 are side views showing the sequence of movements of the window when the device is operating.

DETAILED DESCRIPTION OF THE PREFERRED EMBODIMENTS

Figure 5:
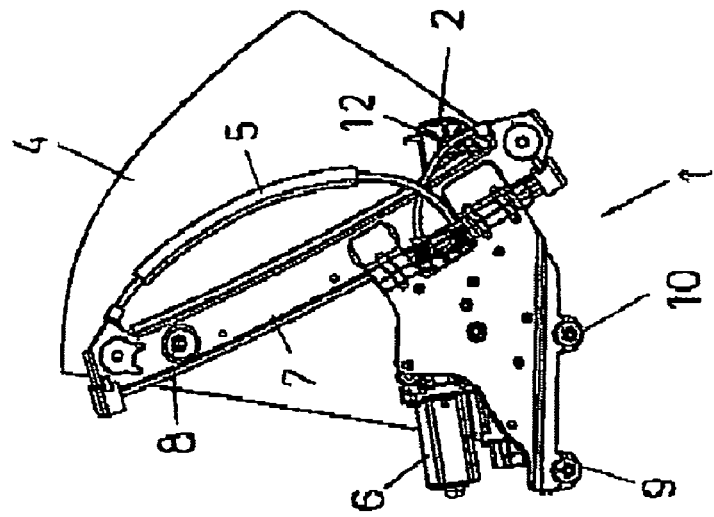
Figure 4:
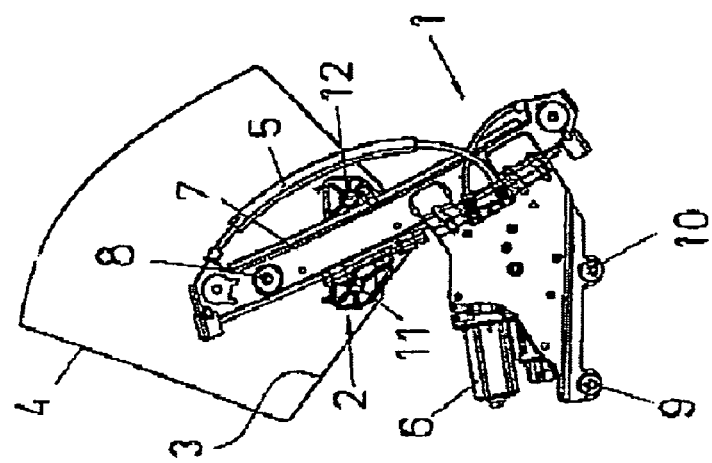
Figure 3:
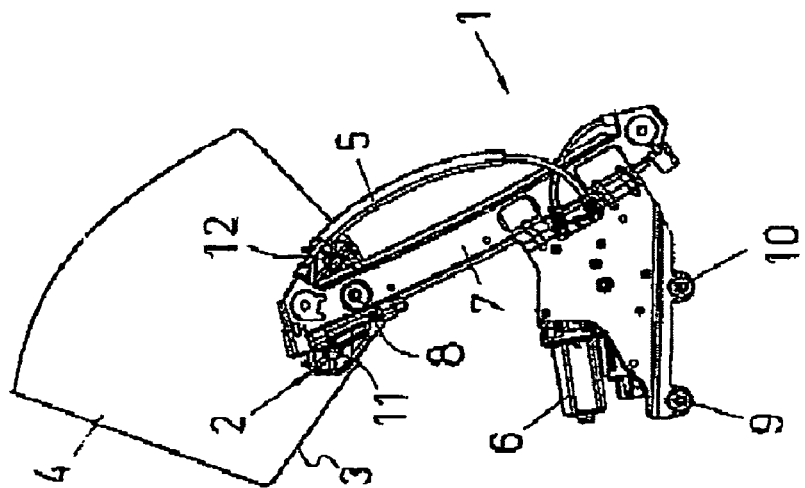

The operating device (1) which is shown by way of an example, comprises a sliding piece (2) equipped with a clamp to hold the lower edge of the window (4) on the cabriolet vehicle as shown in FIGS. 3 to 5 of the attached drawings. The sliding piece (2) is operated by cables (5) and an electric motor (6) which moves along the rail (7). The rail (7) for the device (1) defines the mainly curved trajectory which the window must follow (4) in its operation following the different positions shown in FIGS. 3, 4 and 5.

Figure 1:
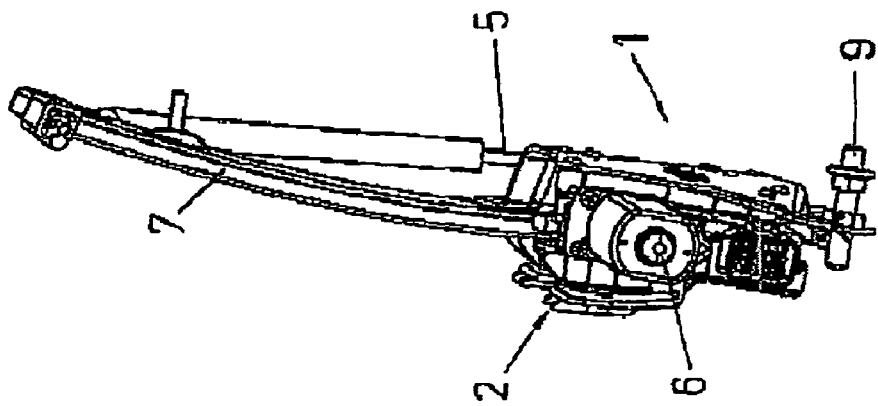
FIG. 1 is a side view of the operating device for rear side windows in cabriolet cars in accordance with the invention showing the aforementioned device without the window for reasons of clarity.
Figure 2:
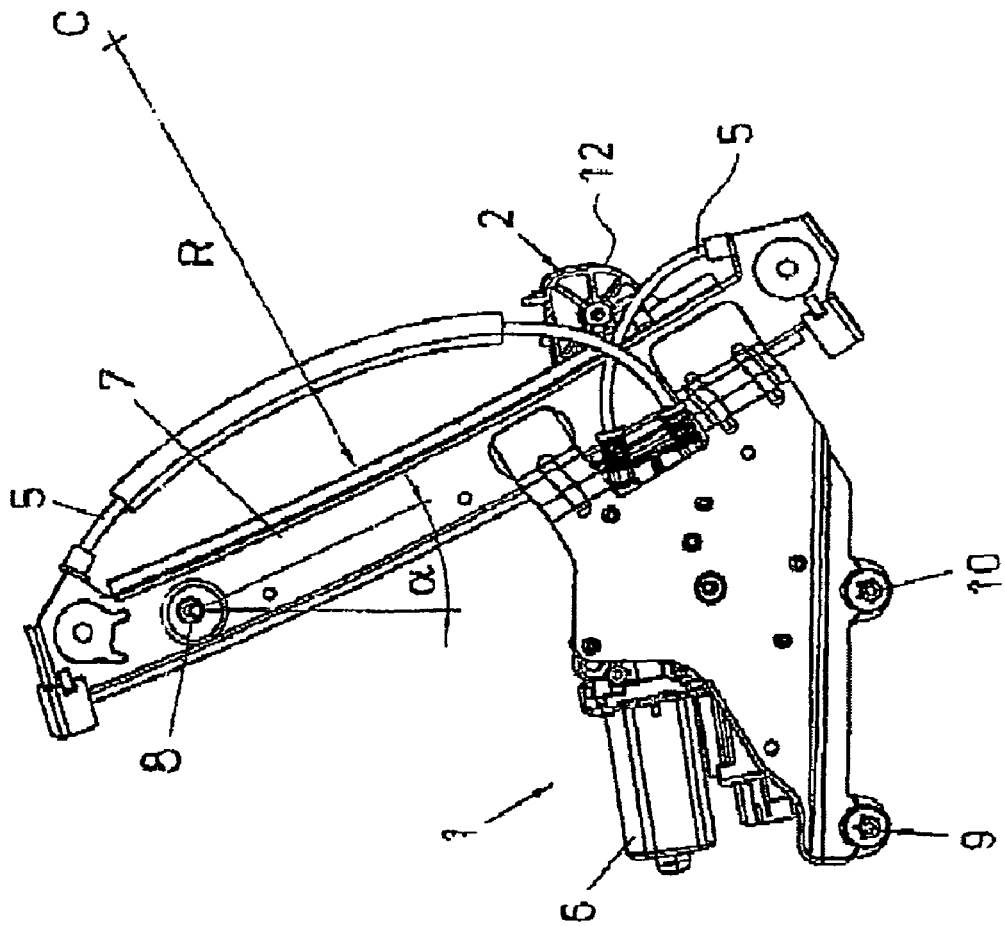
FIG. 2 is a front view of the side window operating device from FIG. 1.

In FIG. 1, the two main parameters for the window's (4) trajectory upwards and downwards are defined. These are:

α angle of departure formed by a vertical line or axis and an axis defined by an upper curvature of the rail (7): and (R): for the trajectory defined by the rail (7) from the centre of the curve (C) to a side of the rail (7) that is substantially perpendicular to the window. That side of the rail (7) is preferably curved to define a substantially curved trajectory which the window follows during operation of the device.

In accordance with tests carried out, it has been found that the angle of departure (a) must be between +45° and −45° and that the radius of curvature (R) must be between ∞ (straight rail (7)) and 500 mm (maximum rail curve).

There are ways of adjusting the position in terms of the vehicle's door (not shown). These methods comprise an upper swivel axle (8) on the rail (7). This upper swivel axle (8) also acts as a fixing axle and allows the rail (7) to tilt slightly to adjust it in the vehicle's door. Adjustment also includes 2 lower transversal screws (9, 10) which operate to laterally regulate the position of the device. Finally the aforementioned adjustment includes screws (in 11, 12 a) on the slider as shown in FIGS. 3 and 4, which allow the glass to be adjusted with regard to the rail-slider (7, 2) equipment on the device (1).

The means of adjusting the position with regard to the vehicle's door allow the device (1) to be widely fitted to the vehicle, which easily compensates for any likely deviation from the design as well as operating wear and tear and tolerances.

Having sufficiently described how the operating device for rear side windows on cabriolet vehicles is formed for this invention using the attached drawings, it is understood that any modification to the detail of the mention which is judged to be suitable may be made whenever the essential features of the summarised invention in the following claims are not altered.

The invention claimed is:

1. An operating device for a vehicle, consisting comprising of:

at least one slider joined to a window; and a single guide rail, the at least one slider slides along the guide rail, the guide rail defining a curved trajectory which the window follows during operation of the device, the guide rail having a side that is curved, and the side of the guide rail being substantially perpendicular to the window, the trajectory being determined by an angle of departure formed by a vertical axis and an axis defined by an upper curvature part of the rail and by a curvature radius of the rail; and means for adjusting the position of the device with regard to a door of the vehicle, wherein the angle of departure is between +45° and −45°.

2. An operating device in accordance with claim 1, wherein the means of adjusting the position of the device include an upper pivoting axle on the rail which allows the device to tilt slightly to fit into the door, using at least two lower transversal screws for lateral adjustment, and at least one screw on the slider which allows the position of the window to be adjusted with regard to the rail and the slider.

3. An operating device in accordance with claim 1, wherein the curvature radius is more than 500 mm.

4. An operating device in accordance with claim 1, wherein the slider is moved by a cable.

* * * * *